United States Patent [19]

Koch et al.

[11] 4,193,701

[45] Mar. 18, 1980

[54] MIXING HEAD FOR A PLURALITY OF FLUID COMPONENTS

[75] Inventors: Freidrich Koch, Achim; Ralf Ludwig, Fribourg; Herbert Gunther, Oyten; Günter Rebers, Achim-Baden, all of Fed. Rep. of Germany

[73] Assignee: Desma-Werke GmbH, Achim bei Bremen, Fed. Rep. of Germany

[21] Appl. No.: 936,658

[22] Filed: Aug. 25, 1978

[30] Foreign Application Priority Data

Sep. 15, 1977 [DE] Fed. Rep. of Germany ....... 2741554

[51] Int. Cl.² ............................................. B01F 5/02
[52] U.S. Cl. ................................... 366/159; 366/177
[58] Field of Search ............... 366/159, 160, 177, 179, 366/267, 138; 222/134, 148, 318; 239/266, 267; 137/604, 609; 23/252 R, 253

[56] References Cited

U.S. PATENT DOCUMENTS

| 3,905,582 | 9/1975 | Fiorentini ............................ 366/159 |
| 4,106,115 | 8/1978 | Takahashi et al. .................. 366/138 |
| 4,126,399 | 11/1978 | Schneider et al. ................. 366/159 |

*Primary Examiner*—Leonard D. Christian
*Attorney, Agent, or Firm*—Sughrue, Rothwell, Mion, Zinn and Macpeak

[57] ABSTRACT

Two axially bored tappet valves 11, 12 are rotatably mounted in a mixing head housing 10. Primary fluid components A and B are supplied to the respective bores through radial passages 21, together with fluid additives C and D supplied through longitudinally displaced radial passages 22, whereby these components A, C and B, D undergo preliminary mixing in collection chambers 19, 20 defined by the bores. The pre-mixed components are then supplied to a final mixing chamber bore 13 defined in the housing, through nozzles 23, 24, from which they may be expelled by an axially reciprocable push rod 14. Prior to expulsion the valves are rotated in unison, which blocks the inlet passages 21, 22 and communicates the pressurized fluid components with respective tangential return passages 25, 26 via partial circumferential grooves 27, 28 in the valves. Such rotation also aligns recesses 29 in the valve bodies with the chamber 13 to allow the push rod to travel freely therethrough.

12 Claims, 4 Drawing Figures

MIXING HEAD FOR A PLURALITY OF FLUID COMPONENTS

BACKGROUND OF THE INVENTION

This invention relates to a mixing head for mixing more than two fluid components, especially for the form foaming of polyurethanes, having a mixing chamber supplied by nozzles for the components and a return flow system for recirculating the components at the end of a mixing cycle.

In a known mixing head of this type as disclosed in DTOS No. 24 16 686 two tappet valves are slidably mounted in a housing. Supply lines for the components are connected to an axial bore of each tappet valve through radial bores. Each tappet valve is also provided with a longitudinally displaced radial bore which opens into a common mixing chamber inside the housing. A cleaning rod is axially movable in the mixing chamber. This rod is utilized to press or expell the mixed components out of the chamber, for example into a mold form. At the end of a mixing cycle the nozzles in the tappet valve are moved into connection with a return line, so that the components can be delivered back to their containers in a recirculating manner. This mixing head is primarily intended for the simultaneous working of just two fluid components.

SUMMARY OF THE INVENTION

A basic object of this invention is to provide an improved mixing head in which more than two fluid components, particularly two main components A and B and at least two additive components C and D, can be intermixed.

In the mixing head according to this invention a plurality of fluid components are fed through a common nozzle into a mixing chamber, and each component is associated with its own return line.

In the form foaming of polyurethanes it is often necessary to mix additives such as colorants, expanding agents and reactive components, such as fire protective materials, into the main components. These additives must be intimately mixed with each other and with the main components. According to this invention the additive components are each separately supplied to the main components before the latter are mixed together. In this manner the main components are already provided with additives when they arrive in the mixing chamber. Recirculation may also be utilized for the additive components such that after completion of a mixing cycle each of the individual components is returned through a separate recirculation system.

The mixing head preferably operates with two tappet valves rotatably mounted in a housing. An axially directed bore is formed in each valve as a collecting chamber, into which one of the main components together with an additive are first introduced for preliminary mixing.

DETAILED DESCRIPTION OF THE PREFERRED EMBODIMENTS

Figure 1:
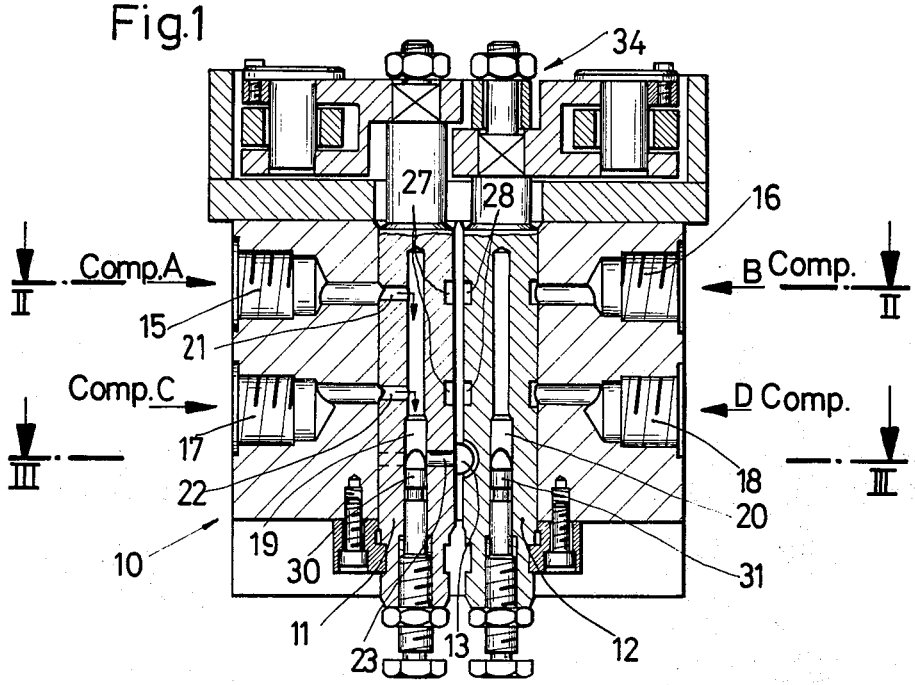
FIG. 1 shows a mixing head according to the invention in horizontal cross section, in different positions of the left and right halves.

The present mixing head consists of a one-piece housing 10. In corresponding bores therein two tappet valves 11 and 12 are rotatably mounted, with both ends projecting out of the housing.

A chamber 13 for receiving and mixing the material components is formed in the housing 10 across and between the valves 11, as a cylindrical bore having a downwardly directed opening. A cleaning rod 14 is axially guided in the chamber 13 and is thus capable of reciprocating motion. During a mixing cycle the rod 14 is drawn back to the chamber 13 (FIG. 3); at the completion of the mixing cycle the rod 14 pushes the material out of the chamber.

The illustrated mixing head embodiment serves to mix four material components. One main component and one additive component are fed to each of the tappet valves 11 or 12. Radial supply lines 15 and 16 for the main components A and B and 17 and 18 for the additive components C and D are arranged for this purpose in the housing 10. The supply lines 15–18 each open into their respective bore of the housing 10 which contains the tappet valve 11 or 12.

The valves 11, 12 are provided with central, axial bores which serve as collecting chambers 19, 20. The associated components A and C or B and D are fed into these collecting chambers 19, 20 through radial bores 21 and 22. In FIG. 1 only the radial bores 21 and 22 of tappet valve 11 can be seen, because tappet valve 12 has a relative rotary position which does not show its radial bores.

Further radial bores or nozzles 23, 24 (see FIG. 3) communicate with the collecting chambers 19, 20. Through these nozzles which are arranged in the flow direction of the material components in the radial bores 21, 22, the collected components of the respective tappet valves 11, 12 are fed into the mixing chamber 13, where the components of one valve are intimately mixed with the components of the other valve.

Figure 2:
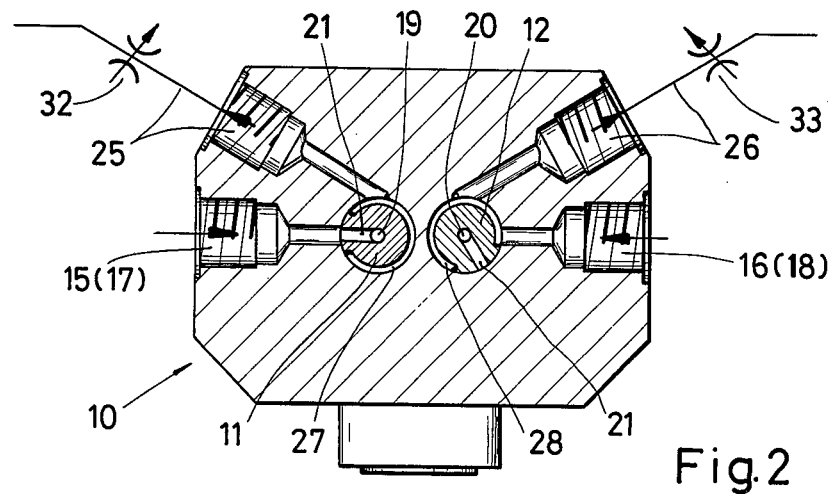
FIG. 2 shows a cross section of the mixing head of FIG. 1 taken along lines II—II.

The housing 10 is also provided with return lines 25 and 26. Each material component, and accordingly each supply line 15–18, is associated with its own separate return line 25 or 26. FIG. 2 shows only the return lines 25 and 26 associated with supply lines 15 and 16. The return lines 25 and 26 are respectively arranged in approximately the same cross-sectional plane as the associated supply lines 15–18. In FIG. 2 the return lines 25, 26 are approximately tangential to the bores containing the tappet valves 11, 12.

The supply line openings may alternatively be communicated with the radial bores 21 and 22 and thereby to the collecting chambers 19, 20 of the valves and to the return lines 25, 26 the latter after completion of a mixing cycle to thus implement recirculation. Connecting channels are formed for this purpose in the planes of the radial bores 21, 22 and the lines 15–18; 25, 26. These channels are formed as peripheral grooves 27 and 28 in the tappet valves 11, 12, and extend over a portion of the circumference of the valves outside of and surrounding the radial bores 21, 22.

In FIG. 2 the valve 11 has been rotated into the mixing position in which the supply lines 15, 17 communicate with the chamber 13 through the radial bores 21, 22, the collecting chamber 19, and the nozzle 23.

The valve 12 in FIG. 2 is in the recirculation position wherein the supply lines 16, 18 and return line 26 communicate with each other through the grooves 28 in a direct, short-circuiting manner. In this position the radial bore 21 is blocked.

Figure 3:
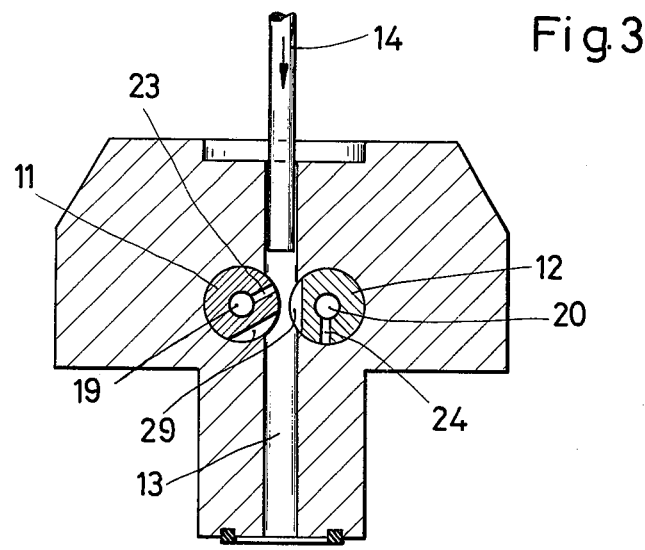
FIG. 3 shows a cross section of the mixing head of FIG. 1 taken along lines III—III.

FIG. 3 shows the tappet valves 11, 12 in the area of the nozzles 23, 24 in the corresponding positions. In valve 11 the nozzle 23 is directed into the chamber 13 at an oblique angle; nozzle 24 is blocked.

The valves are also provided with trough-like recesses 29 which enable the passage of the rod 14 in the position shown for valve 12 in FIG. 3.

Throttle pins 30 and 31 project from one end into the collecting chambers 19, 20 of the valves. These throttle pins control the supply of the material components to the nozzles 23, 24 by axial adjustment.

A further feature may be seen in FIG. 2, wherein adjusting throttles 32, 33 are respectively arranged in the return lines 25, 26. By means of these throttles the pressure in the return flow system can be adjusted.

Figure 4:
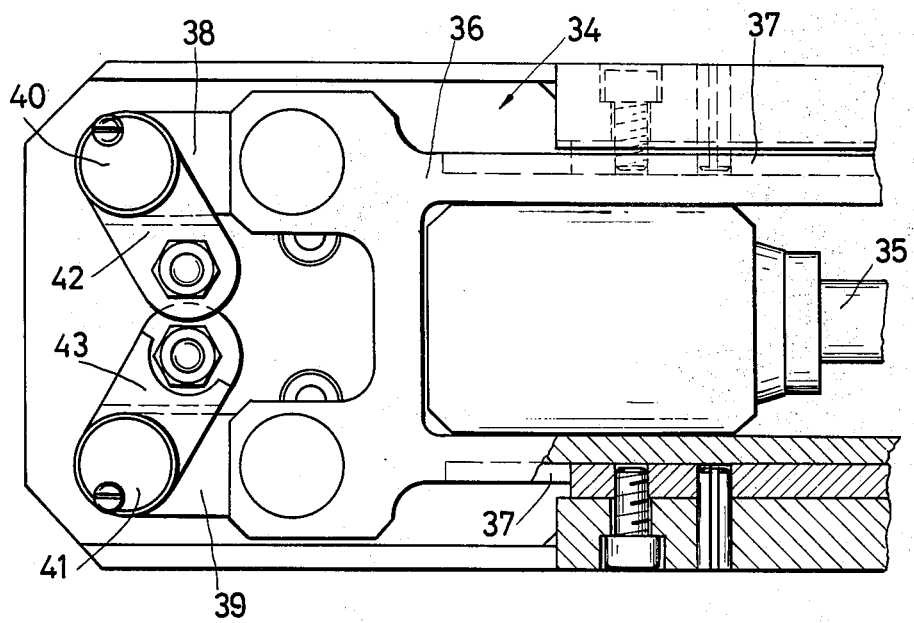
FIG. 4 shows a front view detail of the drive for the valve tappets of the mixing head.

The valves 11, 12 can be rotated in unison. For this purpose the ends of the valves which project out of the housing 10 are connected to a common actuating drive 34. As shown in FIG. 4 this drive 34 consists of a sliding member 36 disposed in a guide 37, which is acted upon by the piston rod 35 of a cylinder (not shown). Extensions 38, 39 on the fork-like ends of the slide member 36 are connected with pivot plates 42, 43 by joints 40, 41. The pivot plates 42, 43 are non-rotatively joined to the ends of the valves. Reciprocating movements of the slide member 36 are thus translated into pivoting motions of the plates 42, 43.

What is claimed:

1. In a mixing head apparatus for mixing more than two fluid components, particularly for the form foaming of polyurethanes, and including a mixing chamber, nozzle means for supplying the components to the chamber and flow system means for returning the components to their sources at the end of a mixing cycle, the improvements characterized by: means for supplying first main fluid components and second additive fluid components into the mixing chamber through respective common nozzles, a return line selectively communicable with each fluid component, and a collecting chamber bore disposed in the flow path of each nozzle for its associated fluid.

2. Mixing head apparatus according to claim 1, wherein the supply of fluid components to each collecting chamber may be blocked while simultaneously communicating each fluid supply source with its associated return line.

3. Mixing head apparatus according to claim 2, wherein each main fluid component and an additive fluid component are supplied through an adjustable tappet valve having a common nozzle communicable with the mixing chamber and having a collecting chamber which leads thereto, whereby each fluid component may be supplied to its associated collecting chamber through its own supply line.

4. Mixing head apparatus according to claim 3, wherein an axial collecting chamber bore is defined in each tappet valve with which radial bores to the respective supply lines and at least one further radial nozzle bore communicate.

5. Mixing head apparatus according to claim 4, wherein the fluid components of each tappet valve low together before reaching the nozzle bore.

6. Mixing head apparatus according to claim 5, wherein the supply lines may be individually and alternately connected to the radial bores of the collecting chambers or to the associated return lines by rotating the tappet valves.

7. Mixing head apparatus according to claim 6, wherein the openings of the supply lines and the return lines are arranged in the same successive peripheral planes of the tappet valves, and can be communicated with or isolated from each other by a groove defined in the periphery of each tappet valve.

8. Mixing head apparatus according to claim 7, wherein the radial bores are arranged in approximately the same cross-sectional plane as the grooves in the tappet valves but are spaced therefrom.

9. Mixing head apparatus according to claim 8, wherein two tappet valves are arranged in a common housing having supply lines radially directed to the tappet valves and tangentially disposed return lines.

10. Mixing head apparatus according to claim 9, wherein the pressure in the return lines is adjustable by means of throttles.

11. Mixing head apparatus according to claim 10, wherein the tappet valves may be simultaneously rotated by a common drive.

12. A fluid component mixing head apparatus, comprising:
    (a) a housing block,
    (b) a pair of valve spools rotatably disposed side-by-side in parallel bores defined in the block,
    (c) two pairs of axially spaced fluid component supply passages defined in the block and respectively communicating with each valve spool bore,
    (d) an axial pre-mixing bore defined in each valve spool,
    (e) two pairs of radial passages individually defined in each valve spool respectively communicable with the supply passages and extending into the pre-mixing bores,
    (f) a final mixing chamber defined in the block and communicating with each valve spool bore,
    (g) a radial outlet nozzle defined in each valve spool extending into a pre-mixing bore and communicable with the final mixing chamber,
    (h) a return passage defined in the block for each of the four fluid components,
    (i) a partial circumferential groove defined in each valve spool, surrounding each radial passage, and selectively communicable between each supply passage and each return passage, and
    (j) means for rotating the valve spools in unison between fluid component mixing positions and return positions.

* * * * *